United States Patent [19]
Bell et al.

[11] Patent Number: 5,550,937
[45] Date of Patent: Aug. 27, 1996

[54] MECHANISM FOR REGISTERING DIGITAL IMAGES OBTAINED FROM MULTIPLE SENSORS HAVING DIVERSE IMAGE COLLECTION GEOMETRIES

[75] Inventors: David M. Bell, Palm Bay; Joseph K. Bryan, West Melbourne, both of Fla.; Stephen B. Black, Arlington, Va.

[73] Assignee: Harris Corporation, Melbourne, Fla.

[21] Appl. No.: 304,316

[22] Filed: Sep. 12, 1994

Related U.S. Application Data

[63] Continuation of Ser. No. 982,071, Nov. 23, 1992, abandoned.

[51] Int. Cl.$^6$ .................................................. G06K 9/32
[52] U.S. Cl. .......................... 382/293; 382/278; 382/294; 382/295
[58] Field of Search ................................ 382/100, 107, 382/113, 154, 191, 276, 278, 293, 294, 295, 296, 302, 130–132; 356/390, 399, 400, 401; 358/450; 364/731; 342/25; 348/699, 701; 395/127, 135

[56] References Cited

U.S. PATENT DOCUMENTS

| | | | |
|---|---|---|---|
| 3,748,644 | 7/1973 | Tisdale | 382/201 |
| 3,905,045 | 9/1975 | Nickel | 382/294 |
| 4,590,607 | 5/1986 | Kauth | 382/294 |
| 4,635,293 | 1/1987 | Watanabe | 382/294 |
| 4,644,582 | 2/1987 | Morishita et al. | 382/130 |
| 4,899,393 | 2/1990 | Morishita et al. | 382/130 |
| 5,005,147 | 4/1991 | Krishen et al. | 364/578 |
| 5,022,089 | 6/1991 | Wilson | 382/288 |
| 5,048,103 | 9/1991 | Leclerc et al. | 382/293 |
| 5,146,228 | 9/1992 | Irani et al. | 356/2 |
| 5,155,774 | 10/1992 | Numagami | 382/113 |
| 5,251,271 | 10/1993 | Fling | 382/294 |

OTHER PUBLICATIONS

A. Goshtasby, "Registration of images with geometric distortions", IEEE Transactions on Geoscience and Remote Sensing, vol. 26, Iss. 1, p. 60–4, Jan. 1988.

Cracknell, et al. "Fast Automatic Registration for Satellite Imagery by Using Heuristic Planning." IEE Proc. F (Radar and Sig. Process) vol. 136, Iss 5, pp. 221–225 Oct. 1989.

Wu et al. "Registration of a Spot Image and a SAR Image Using Multiresolution Representation of a Coastline." Proc. 10th Int. Conf. on Pat. Rec. vol. 1, pp. 913–917 Jun. 1990.

Simchony et al. "Pyramid Implementation of Optimal–Step Conjugate–Search Algorithms for Some Low–Level Vision Problems" IEEE Trans. Syst. Man, Cyb. vol. 19 Iss. 6, pp. 1408–1425 Dec. 1989.

*Primary Examiner*—Joseph Mancuso
*Assistant Examiner*—Richard Stokey
*Attorney, Agent, or Firm*—Charles E. Wands

[57] ABSTRACT

First and second digital images, such as terrestrial images captured by one or more spaceborne or airborne sensors, are transformed onto a registration surface in accordance with geometry models of the sensors, to bring the digital images into mutual alignment on the registration surface. The images are initially subsampled to obtain reduced spatial resolution versions of each image. For a base resolution version of each image, respective neighborhoods of pixels associated with matching point grids in each image are defined. Edge-preemphasized contents of respective neighborhoods of pixels of each image are cross-correlated with one another, to derive a measure of misregistration between the images. One or both of the geometry models of the sensors are modified in accordance with the measure of misregistration, so as to effectively decrease misregistration between the images on the registration surface. The neighborhood cross-correlation process is then repeated for increasingly higher spatial resolution versions of each image, to effect a coarse-to-fine improvement in registration error correction.

10 Claims, 10 Drawing Sheets

MEASUREMENT VECTOR
AND 2D VARIANCE

ROTATE MAJOR AXIS
TO HORIZONTAL

SCALE MAJOR AND MINOR
AXIS TO UNITY

ROTATE TO X AND Y PARALLAX
COORDINATE DIRECTIONS

MECHANISM FOR REGISTERING DIGITAL IMAGES OBTAINED FROM MULTIPLE SENSORS HAVING DIVERSE IMAGE COLLECTION GEOMETRIES

This is a continuation of application Ser. No. 982,071, filed Nov. 23, 1992, abandoned.

CROSS-REFERENCE TO RELATED APPLICATIONS

The present application relates to subject matter disclosed in our co-pending U.S. patent applications Ser. Nos. 07/980,501 and 07/980,500, filed on even date herewith, respectively entitled "User Interface Mechanism for Interactively Manipulating Displayed Registered Images Obtained from Multiple Sensors Having Diverse Image Collection Geometries," and "User Interface Mechanism for Interactively Setting Differential Elevation of 'Micro-relief' Registration Surface for Registering Images Obtained from Multiple Sensors Having Diverse Image Collection Geometries," assigned to the assignee of the present application and the disclosures of which are herein incorporated.

FIELD OF THE INVENTION

The present invention relates in general to image processing systems, and is particularly directed to a mechanism for effectively mutually registering a plurality of digital images of an object, such as terrestrial images that have been obtained by a plurality of spaceborne or airborne sensors, object observation and image collection parameters of which can be expected to be different from one another.

BACKGROUND OF THE INVENTION

Although the availability of a wide variety of image sensors makes it possible to supply an image processing system with a wealth of information in the form of a large number of images of the same scene or object, actually correlating the information content in such images may be a significant challenge to the user. This difficulty arises from the fact that the images may be, and particularly in the case of spaceborne or airborne terrestrial imaging systems, can be expected to be derived from sensors having different observation and collection geometries, as well as different wavelength sensitivities.

In order to facilitate exploitation of information contained in multiple images of a scene, it is often an a priori requirement that the images be mutually registered or aligned. Unfortunately, this registration requirement is not easily fulfilled when the images are derived from diverse types of sensors having different observation and collection geometries. Indeed, it is often the case that multiple images of the same terrestrial area are obtained at different times (seasons) of the year.

SUMMARY OF THE INVENTION

In accordance with the present invention, the need to mutually register multiple images that have been derived from diverse types of image collection devices, including those having different observation geometry parameters, is successfully addressed by a new and improved image processing mechanism which correlates the edge content of reduced sized neighborhoods of pixels distributed throughout respective ones of a pair of digital images to be mutually aligned. The digital images to be registered are obtained by translating or referencing the original images to a prescribed registration surface, such as a terrestrial image plane, in accordance with the geometry projection parameters of the respective image collection systems from which the pair of original images were obtained.

Based upon the neighborhood correlation of edge content, an estimate is derived of the misalignment or misregistration of the two digital images in the registration surface. This estimate of misregistration is employed to modify or adjust either or both of respective sets of parameters through which the collection geometries of the image collection sources or sensors are defined, thereby correcting or improving the degree of co-registration of the respective translations or projections of the two original images upon the registration surface.

More particularly, pursuant to the present invention, each of the original image output from the sensors, for example very high definition images, each having a spatial resolution on the order of thousands of pixels per side (such as a 4096×6144 digital image) are subjected to sequential sub-sampling or decimation, in order to obtain reduced spatial resolution data sets, or plural versions of each of the original digital images, having successively reduced spatial resolutions from the relatively high definition spatial resolution down to a prescribed base resolution, for example on the order of 128×192 pixels square. Each of the images to be processed, regardless of its spatial resolution, is defined with respect to or translated to a common image surface, such as a terrestrial image plane, using the geometric model of the sensor through which the image has been obtained, in order that the co-registration correlation process, to be described below, may be carried out.

In order to effect respective sets of neighborhood correlations, a respective array or grid of matching points, about which the correlation neighborhoods are to be defined, is established in expected overlap region of the images obtained from one of the sensors. Using the geometrical model of the one sensor, this array of matching points is translated onto the registration surface. Then, using the geometrical model of the other sensor, the array of matching points that has been translated onto the registration surface is complementarily translated into the original (high spatial resolution) image of the other sensor. The coordinates of the matching points are then located within the respective reduced spatial resolution images of the reduced resolution data sets of each of the images.

Beginning with a relatively low spatial resolution version, such as the lowest spatial resolution data set, or the base resolution version of a first of the images, first neighborhoods of pixels, each having a relatively limited number of pixels (e.g. thirty-two on a side) are defined such that the neighborhoods respectively surround the matching points. Similarly, within the second base image, second neighborhoods of pixels are defined such that the second neighborhoods surround respective matching points of that image. The number of pixels per neighborhood in the first image is different from (less than) the number of pixels per neighborhood in the second image, so that a prescribed adjustment (x and y translation) tolerance allows the smaller neighborhood to be moved within the larger neighborhood in the course of cross-correlation of the two images.

The first base image is then resampled to derive pixel values contained within respective ones of the first neighborhoods of pixels. Similarly, the second base image is resampled to derive pixel values contained within respective ones of the second neighborhoods of pixels. These respective neighborhoods of pixels are then translated onto the registration surface so that they may be correlated with one another to derive a measure of the degree of co-registration between the first and second images and thereby the degree of error in the parameters of the respective geometry models of the two image sensor systems.

Specifically, the edge contents of the first and second reference plane-translated neighborhoods of pixels are emphasized through a (non-linear) high-pass filtering operation, and then respective ones of edge content-emphasized first neighborhoods of pixels are cross-correlated with respective ones of edge content-emphasized second neighborhoods of pixels. This cross-correlation operation produces a correlation surface having a distribution of correlation peaks that are employed to derive a measure of the misregistration between the first and second terrestrial image plane-translated images.

For this purpose, the correlation peaks are normalized and, for each neighborhood of resampled and translated pixel values of the respective images, coordinate offsets of a prescribed number or set (e.g. four) of the highest correlation peaks with respect to their associated matching points (vector quantities) are determined. The number of peaks per set is not limited to a particular number; the number four is based upon practical considerations, such as computational complexity (data processing speed).

In addition to determining the degree of offset of the correlation peaks from their associated matching points, the shapes of the set of correlation peaks are analyzed. Using these two measures—geometric offset and shape, a misregistration value is assigned to each of the sets of the (four) highest correlation peaks in each neighborhood. These measurements are grouped together in subsets of similar or closely related measurements based upon how close the measurements fall within a prescribed window or range of values. A quality metric is assigned to each subset indicative of the accuracy to which that subset is representative of misregistration between the two images. The difference between the two largest quality metrics is compared with a prescribed threshold value and, in response to the difference exceeding the threshold value, a measure of misregistration between the two images is produced using the subset having the largest quality metric.

If the compared difference fails to exceed the threshold value, the above described neighborhood correlation process is repeated using first and second arrays of matching points having a spatial separation that has been decreased relative to that of the previous neighborhood cross-correlation process. Should the compared difference still fail to exceed the threshold value after a predetermined number of repetitions of using first and second arrays of matching points having successively increased values of spatial resolution, then a measure of misregistration between the two images is derived in accordance with the subset having the largest quality metric.

Using this measure of misregistration, at least one of the first and second geometric models of the sensors, through which the first and second digital images were originally obtained, is modified, so as to effectively decrease the degree of misregistration between the first and second terrestrial image plane-referenced images. The modification is such that there is a minimal perturbation of parameters of the geometric models of the sensors. To facilitate processing of a set of n space parameters through which geometric models of the sensors are defined, conjugate gradient processing is preferably employed.

Once the parameters of the geometric models of the image collection sensors have been updated, the above-described neighborhood correlation process is repeated for increasingly higher spatial resolution versions of each of the two images up to and including the original, highest spatial resolution versions of the two terrestrial image plane-referenced images, so as to iteratively modify the geometric models of the sensors and thereby further improve mutual registration of the two images on the registration image surface. Upon completion of the process, the parameters of the geometric models will have been effectively optimized, so that co-registration of images of any of the available spatial resolutions image may be conducted.

DETAILED DESCRIPTION

Figure 1:
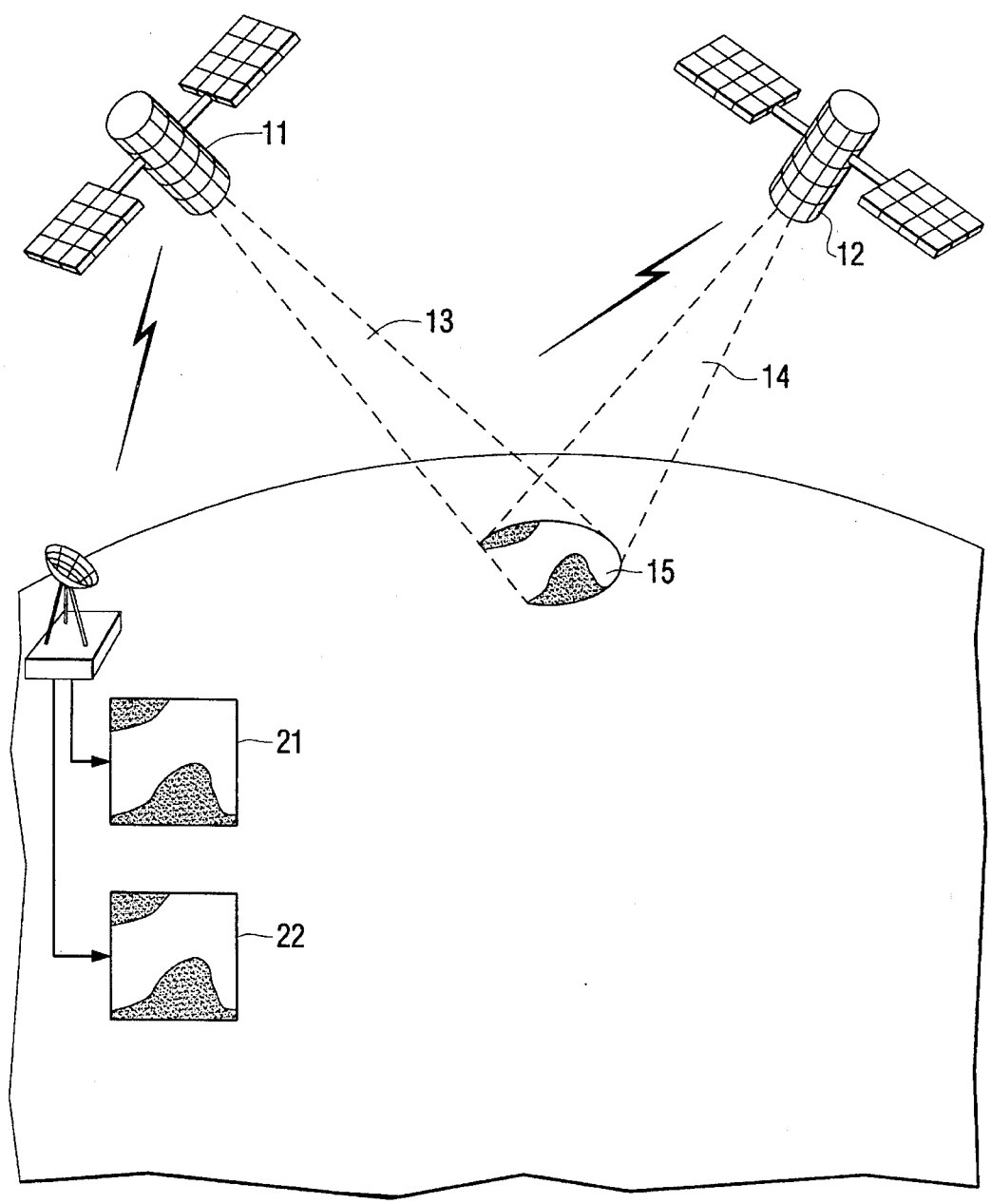
FIG. 1 diagrammatically illustrates a pair of satellite-based image sensors which collect images of the earth and having image collection fields of view which observe a common area of the earth's surface.

Before describing in detail the digital image registration mechanism in accordance with the present invention, it should be observed that the present invention resides primarily in what is effectively a prescribed digitized image transformation operator which is preferably incorporated within the image processing software employed by a digital image processing system. Consequently, the configuration of such a system and the manner in which it is interfaced with a digital image source have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and the image processing diagrams of the Figures are primarily intended to illustrate the major components of the system in a convenient functional grouping, and an example of the application of the image processing operators of the present invention to an illustrative example, whereby the present invention may be more readily understood.

As a non-limitative example the present invention may be implemented with the following hardware, software components: 1—Hardware: a Sun SPARC 2 workstation having color monitor, 32 Megabytes of RAM, 100 Megabytes of Swap Space and an Exabyte 8200 2.3 gigabyte low density drive, (500 megabytes of disk is sufficient); 2—Software: Unix/X Windows/C++, SunOS Unix Version 4.1.2, SunOS Open Windows Version 3.0, SunOS C++ Compiler Version 2.1, SunOS FORTRAN Compiler Version 1.4, SunOS DevGuide Version 1.1. A copy of the object code which, when loaded and run on the above-described operating system, executes the inventive mechanism to be described below, is supplied as an Appendix A. A copy of the system software user's manual for operating the loaded system is supplied as an Appendix B.

For purposes of providing an illustrative example, the images to be processed will be presumed to correspond to images of the earth, collected by a pair of image sensors 11 and 12, diagrammatically illustrated in FIG. 1 as having image collection fields of view 13 and 14, respectively, which observe a common area 15 of the earth's surface. As noted above, sensors 11 and 12 are not limited to any particular type, and may include any of a variety of spaceborne or airborne imaging systems, including, but not limited to Landsat-type multi-spectral mapping cameras, Spot-type visual imagers, and radar etc., customarily employed for terrestrial image mapping. The original images as captured by sensors 11 and 12 are either output directly or converted into first and second digital images 21 and 22, respectively having a prescribed (relatively high) spatial resolution (e.g. on the order of 6144×4096 pixels square for image 21 and on the order of 8192×6144 pixels square for image 22) encoded to a predefined digital encoding resolution (e.g. eight bits per color per pixel or twenty four bits per pixel).

Figure 2:
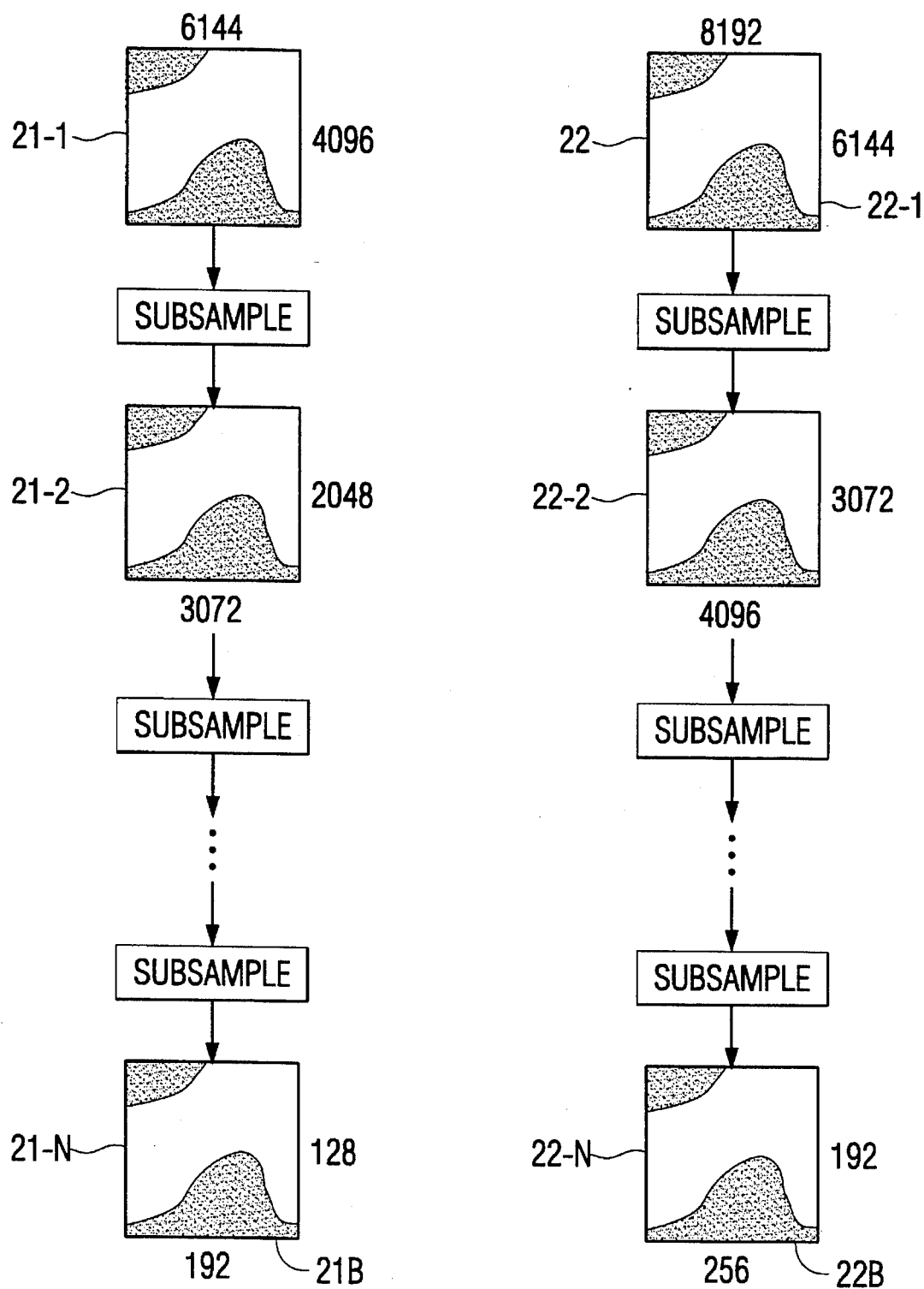
FIG. 2 diagrammatically illustrates the manner in which each of original images derived from separate sensors of FIG. 1 is subjected to sequential subsampling to obtain reduced spatial resolution versions of each of the original images.

As diagrammatically illustrated in FIG. 2, each of the original images 21 and 22 is subjected to sequential sub-sampling or decimation, in order to obtain reduced spatial resolution data sets, or plural versions of each of the original digital images, having successively reduced spatial resolutions from the relatively high definition spatial resolution of the original images to some lowest spatial or base resolution. This successive decimation scheme is shown as producing what are commonly referred to as pyramids 25, 26 of reduced resolution images 21-1 . . . 21-N and 22-1 . . . 22-N, namely plural differential spatial resolution versions of each of digital images 21 and 22, having successively reduced spatial resolutions from the relatively high definition spatial resolution of original images 21 (e.g. 6144×4096 pixels square) and 22 (e.g. 8192×6144 pixels square) down to a prescribed base resolution of images 21-N, 22-N, (for example, on the order of 128×192 pixels square for image 21-N, and 256×192 pixels square for image 22-N), identified as base resolution images 21B, 22B.

Figure 3:
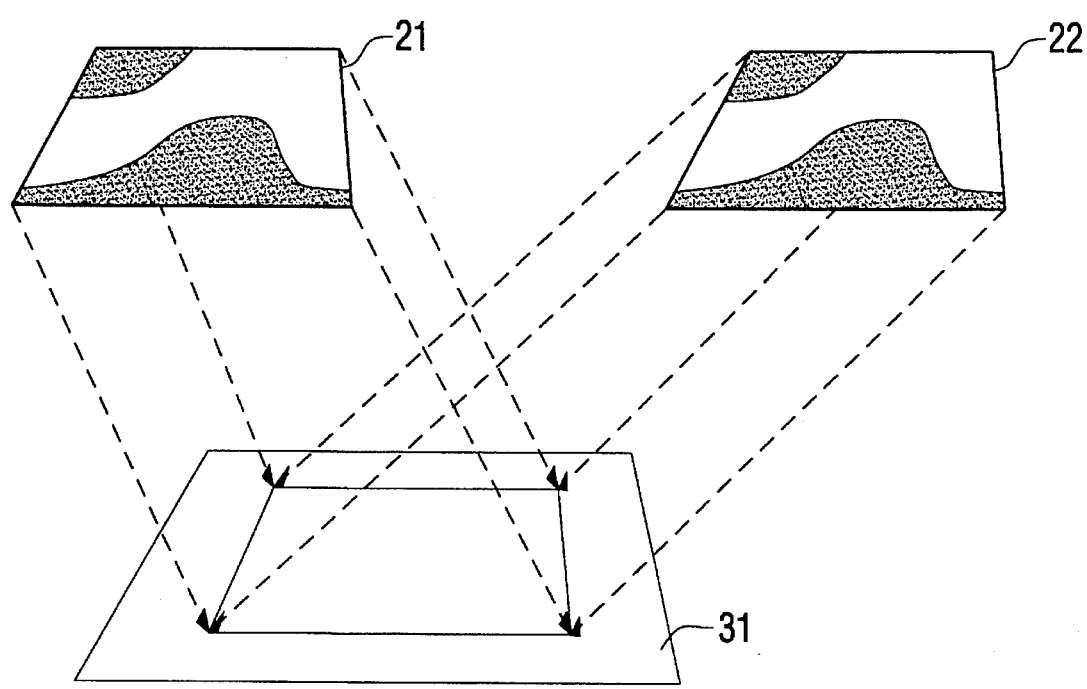
FIG. 3 diagrammatically illustrates co-registration plane upon which images obtained by the sensors of FIG. 1 are translated for image matching or registration processing.

As pointed briefly above, all digital images to be processed in accordance with the registration matching mechanism of the present invention, regardless of their respective spatial resolutions, are first translated to a common (co-registration) surface, using geometrical models of the sensors through which the images have been obtained, in order that the co-registration correlation process, to be described in detail below, may be carried out. For purposes of the present description, the co-registration surface is assumed to be a terrestrial reference plane, shown in FIG. 3 as co-registration plane 31 upon which images 21 and 22 obtained by sensors 11 and 12 respectively are translated for processing.

For this purpose the image translation mechanism may comprise a conventional image mapping algorithm which is driven by the geometric model of a spaceborne imaging system, including known location and image collection characteristics of the sensor at the time of capturing the image. One non-limitative example of a collection geometry model that may be employed in the case of imagery data obtained from the SPOT satellite is described in detail in an article by A. Lee entitled "SPOT Satellite Sensor Model Design" supplied as Appendix C. It should be observed however, that this particular model is merely given as one example of a model that may be used in connection with the SPOT satellite. Other models may also be used for this particular satellite and, in the case of other sensors, each will have its own model. What is required, regardless of the image collection system employed, is that the model transform coordinates of the captured or sensed image to coordinates of a reference (co-registration) surface, such a terrestrial ground plane and have adjustable parameters.

It should also be observed that the geometry of the projection surface (planar surface 31, in the present example) need not be of any particular shape, but may be mathematically defined to include changes in elevation across its surface; namely its contour is definable in terms of elevation (denotable as h), latitude (denotable as phi) and longitude (denotable as lambda). For example, in the case of terrestrial images, the registration surface may comprise a surface whose characteristics are defined from elevation/terrain data obtained from the Defense Mapping Agency. The characteristics of the co-registration projection surface 31 are also a priori inputs to the translation operator through which the captured image is referenced to the registration surface 31.

Figure 4:
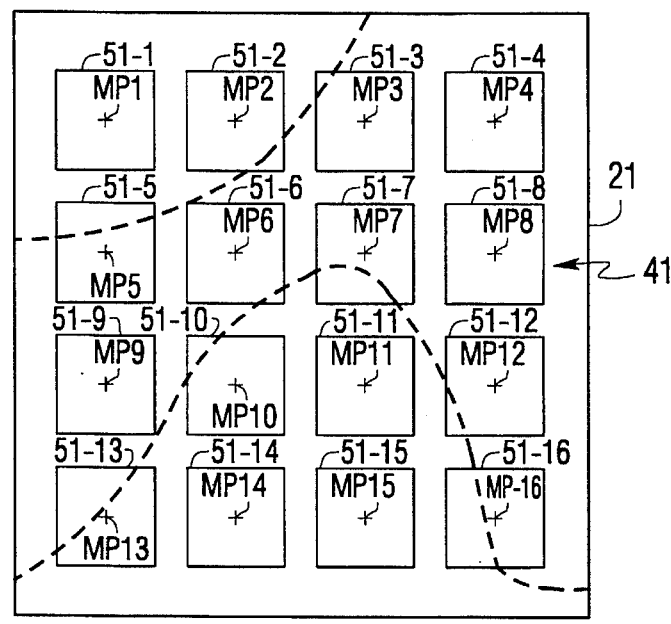
FIG. 4 illustrates a grid of matching points superimposed or geometrically projected upon an original high resolution image.

Next, as shown in FIG. 4, an array or grid 41 of matching points MP is superimposed or geometrically projected upon one of the images in the expected region of overlap of the two images, for example the original high resolution image 21 output by sensor 11. The number of matching points per grid is not limited to a particular value but is chosen so as to ensure a distributed spatially even coverage of the overall image. For purposes of example, each grid may comprise a four-by-four array of sixteen matching points MP1–MP16. Grid 41 is superimposed upon image 21 in order to locate respective image patches or neighborhoods 51-1 ... 51-16 of pixels that are to be correlated with similar sets or neighborhoods of pixels within image 22.

Figure 5:
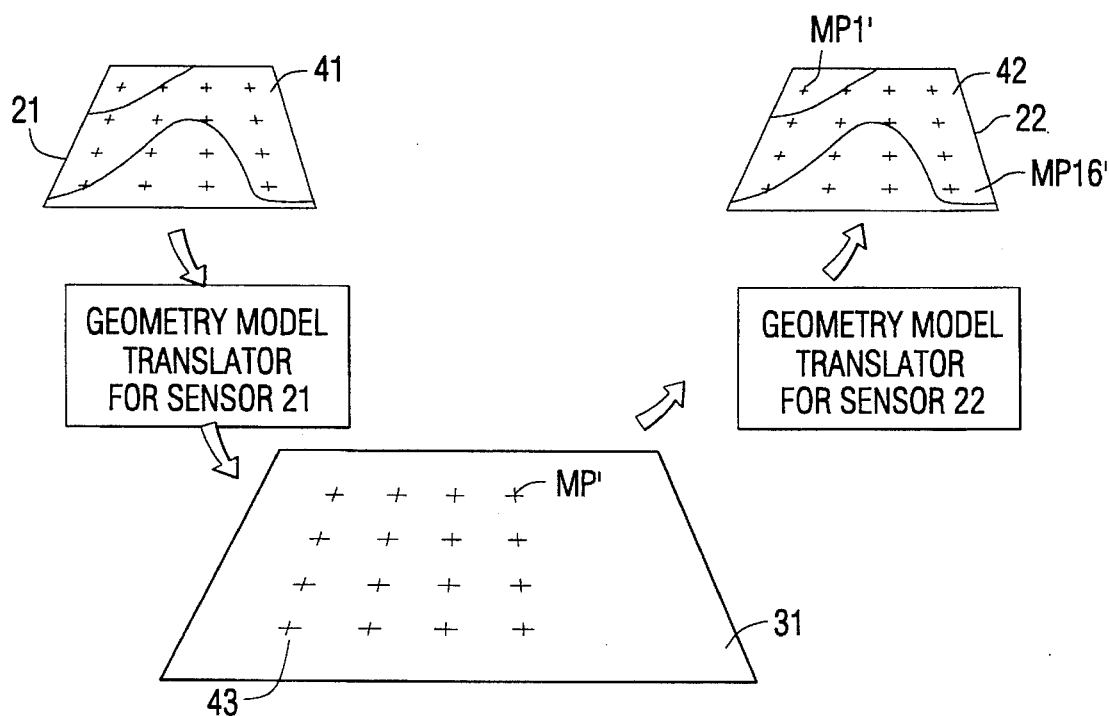
FIG. 5 shows the manner in which a sensor geometry model translates a matching point grid onto the registration surface.

As shown in FIG. 5, using the geometry model employed to define the translation mechanism associated with sensor 11, grid 41 is translated onto registration surface 31 to define a translated matching grid 43 of translated matching points MP'. Then, using the geometrical model of sensor 12, the matching points MP' of grid 43 are complementarily translated into the original (high spatial resolution) image 22 obtained by sensor 12 as an array 42 of matching points MP1" ... MP16". Once the respective grids 41 and 42 have been generated for each of the original images 21 and 22, the coordinates of their respective matching points are readily located within the reduced spatial resolution images 21-1 ... 21-N and 22-1 ... 22-N.

As described briefly above, the image registration mechanism of the present invention obtains a measure of the error in the mapping geometry associated with the respective sensors by correlating edge content of (reduced sized) neighborhoods of pixels distributed throughout respective ones of the pair of digital images to be mutually aligned. Namely, based upon the neighborhood correlation of edge content, an estimate is derived of the misalignment or misregistration of the translations of the two digital images 21 and 22 within the registration surface. This estimate of misregistration is employed to modify or adjust either or both of respective sets of parameters through which the collection geometries of the image collection sensors 11 and 12 are defined, thereby correcting or improving the degree of co-registration of the respective translations of the two original images upon the registration surface 31.

Figure 6:
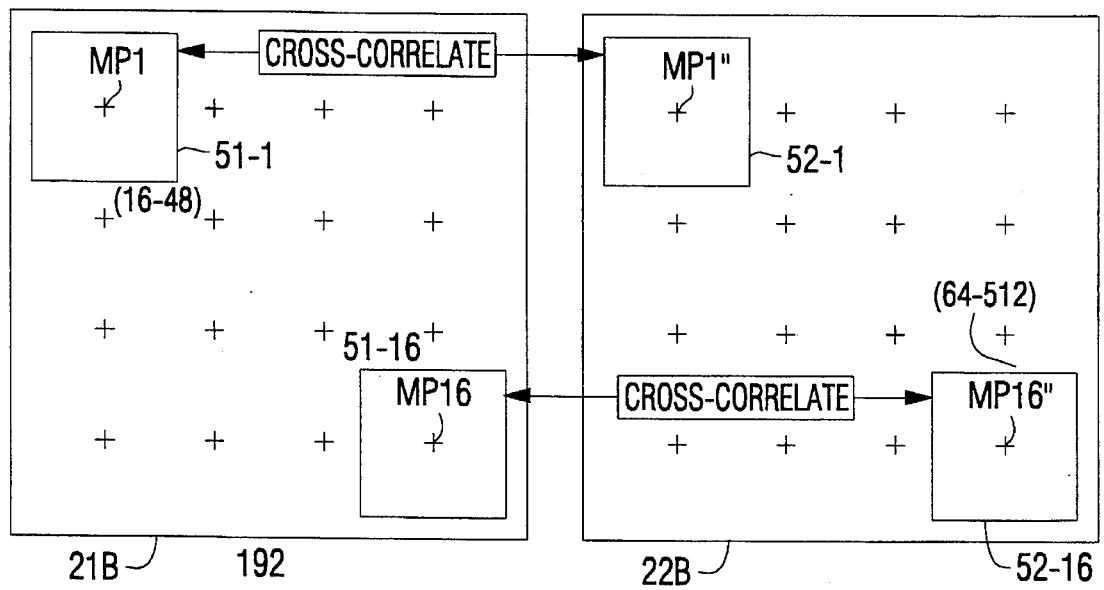
FIG. 6 diagrammatically illustrates the manner in which respective neighborhoods of two images are to be cross-correlated with one another.

Referring now to FIG. 6, the correlation process starts with a relatively low spatial resolution image version, such as the lowest spatial resolution data set or base resolution version 21B of image 21 which, in the present example, may have an image size on the order of 128×192 pixels square. Within base image 21B, matching point grid 41 and associated first neighborhoods 51-1 ... 51-16 of pixels, each having a relatively limited number of pixels (e.g. on the order of 16–48 on a side) are defined such that the grid points MP-1 ... MP-16 are effectively located at the centers of respective neighborhoods 51-1 ... 51-16. Namely, each neighborhood of pixels 51 is relatively even distributed around or 'surrounds' a respective matching point MP.

Similarly, within the second base image 22B, second neighborhoods of pixels 52-1 ... 51-16 are defined so as to surround respective matching points MP1" ... MP16" of matching point grid 42. The number of pixels per neighborhood 52 in the second image 22 is larger than the number of pixels per neighborhood 51 in the first image 21, so that a prescribed adjustment (x and y translation) tolerance allows the smaller neighborhood 51 to be moved within the larger neighborhood 52 in the course of cross-correlation of the two images.

For this purpose, each of neighborhoods 52-1 ... 52-16 may comprise on the order of 64–512 pixels per side. It will be observed that for the parameters of the present example, a distribution of sixteen matching points in base images 21B and 22B will result in neighborhoods of pixels that overlap one another. Although some degree of redundancy in data processing results can be expected, the overlap does not alter the intended functionality and effectiveness of the process with respect to the lowest resolution images. However, it will be appreciated that the reduced size of the neighborhoods becomes particularly significant in reducing computational intensity in the course of processing images of increased spatial resolution.

Once the respective neighborhoods 51 and 52 have been defined for each of respective images 21 and 22, the first base image 21B is resampled to extract pixel data values contained within respective ones of the first neighborhoods 51-1 ... 51-16 of pixels and, similarly, the second base image 22B is resampled to extract pixel data values contained within respective ones of the second neighborhoods 52-1 ... 52-16 of pixels. The neighborhoods of pixels (sixteen in the present example) 51 and 52 are then translated onto the registration surface 31, so that associated neighborhoods, namely neighborhoods 51-1/52-1, 51-2/52-2, ..., 51-16/52-16 may be correlated with one another, for the purpose of deriving a measure of the degree of co-registration between the first and second images and thereby the degree of error in the parameters of the respective geometry models of the two image sensor systems.

Figure 7:
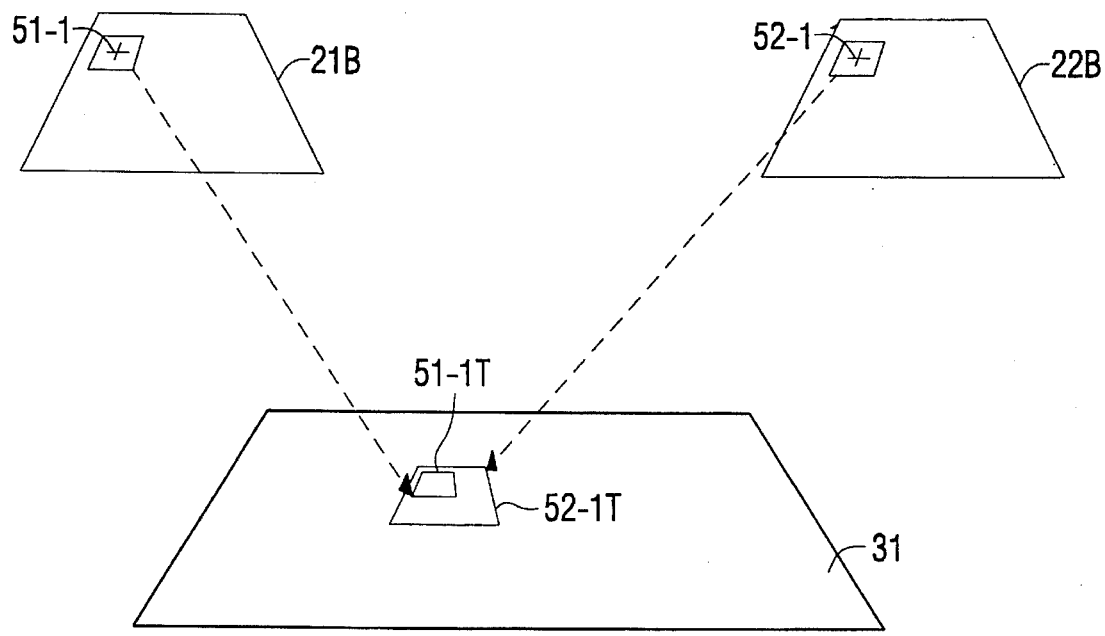
FIG. 7 shows first neighborhoods of sixteen neighborhoods resampled from base images that have been translated as translated neighborhoods onto a co-registration surface for cross-correlation processing.

FIG. 7 shows first neighborhoods 51-1 and 52-1 of the respective sixteen neighborhoods resampled from base images 21B and 22B that have been translated as translated neighborhoods 51-1T and 52-1T, respectively, onto co-registration surface 31 for correlation processing. In accordance with the present invention each translated neighborhood is initially subjected to an edge content preemphasis operation in order to enhance features of each image that will consistently represent common attributes of the image regardless of the brightness or contrast in the images. It should be noted that the preemphasis operation serves to emphasize, rather than detect, edge information within the neighborhoods; it is not a feature extraction operation.

Figure 8:
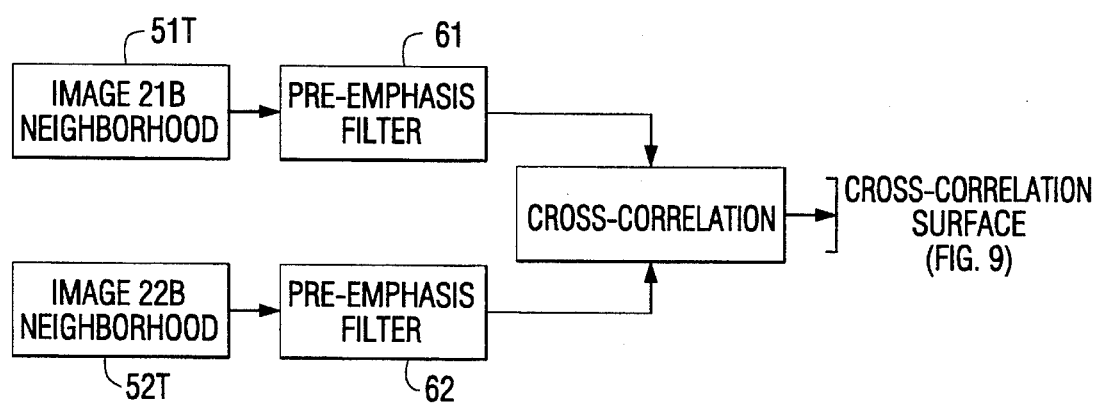
FIG. 8 diagrammatically illustrates image processing paths for two image neighborhoods through edge preemphasis filter operators to a cross-correlation process.

For this purpose, as diagrammatically illustrated in FIG. 8 by edge preemphasis filter operators 61, 62, unsharp masking (convolutional filtering) techniques commonly employed for high spatial frequency enhancement may be employed. Because of the reduced quantity of information available for processing, it is essential that pixel-to-pixel edge transitions be enhanced. It has been found through experimentation that the convolution masks as small as [1×2] in the x direction and [2×1] in the y direction work better than conventional [3×3] or [2×2] masks.

The edge-enhanced digital images derived by operators 61, 62 are cross-correlated with one another as shown at 63 in FIG. 8. Cross-correlation operator 63 effects normalized two-dimensional cross-correlation of the smaller sized neighborhood of pixel values 51T with the larger sized neighborhood of pixel values 52T by incrementally shifting smaller neighborhood 51T throughout the larger area defined by neighborhood 52T and performing multiply and summation steps at each shifted location, thereby producing a three-dimensional cross-correlation surface 71, diagrammatically illustrated in FIG. 9. Cross-correlation surface has respective peaks 73 where there is a high degree of correlation of the contents of the respective neighborhoods. Namely, high correlation values or dominant peaks in the surface indicate locations of good matches between neighborhoods.

The mechanism chosen to implement the cross-correlation operation involves a two-step process for speed and accuracy. Where speed is a driving consideration in the geometric adjustment process, cross-correlation of the two image neighborhoods is preferably implemented in the frequency domain using a Fast Fourier Transform (FFT) operator techniques. In order to achieve highly accurate results, a parametric hill finder is employed. A parametric hill finder involves defining symmetric hills that actually characterize the correlation surface. Each technique will be described below.

NORMALIZED CROSS CORRELATION USING FFT TECHNIQUES

As described above, normalized cross correlation is used to perform the actual matching operation between neighborhoods of the two images, where high cross correlation values indicate good matches, while low cross correlation values indicate poor matches between the image neighborhoods. While this technique works well and produces excellent results, its implementation in the spatial domain is time consuming. Consequently, to reduce computation time, it is preferred to use a frequency domain scheme, specifically Fast Fourier Transform techniques, to be described, which have been found to yield equivalent results and reduce computation time. Results to date indicate that this change decreases the total computation time of the autonomous registration procedure by approximately 20%. Both frequency and spatial domain techniques may be implemented on an array processor, although the presently described implementation is a software mechanism.

Normalized cross-correlation of the two images in the frequency domain using a fast Fourier transform (FFT) processor initially involves transforming neighborhood data from the spatial domain to the frequency domain. More particularly, the spatial domain implementation of normalized cross-correlation may be given by the expression:

$$\rho = \Sigma(x-\mu_x)(y-\mu_y)/(n\sigma_x\sigma_y) \quad (1),$$

where
x=the two dimensional image neighborhood or 'patch' for a first image 21,
y=the two dimensional image neighborhood or patch for image 22,
$\mu_x$=sample mean of x,
$\mu_y$=sample mean of y,
$\sigma_x$=sample standard deviation of x,
$\sigma_y$=sample standard deviation of y.

As described above, the two dimensional patch denoted by x is the smaller of the two patches x and y, so that, in the spatial domain a respective smaller patch or neighborhood 51 of image 21 is moved around or shifted within the confines of the larger patch or neighborhood 52 of image 22, and for each position a normalized correlation value is obtained. Within the above ranges of neighborhood size values, typical sizes for the two patches are 96×96 for the larger neighborhood 52 and 48×48 for the smaller neighborhood 51.

In order to implement the normalized cross correlation in the frequency domain, the above relationship must be simplified. It is a relatively easy exercise to reduce equation (1) to:

$$\rho = \Sigma(x-\mu_x)y/((n)^{1/2}\sigma_x sqrt[\Sigma y^2 - (\Sigma y)^2/n]) \quad (2)$$

While this relationship is not unique, it was chosen specifically for implementation in the frequency domain. It should be noted that both of equations (1) and (2) define only one point. Moreover, the frequency domain implementation will yield a matrix of answers and not just one point at a time as does processing in the spatial domain.

For the present example, n has a value of $48^2$. Since the smaller neighborhood 51 remains the same for each correlation point, surrounding matching point MP, the value of $\sigma_x$ remains constant and need only be calculated once. Consequently, only the numerator, and two terms in the denominator of equation (2) must be calculated in the frequency domain.

The numerator of equation (2) is a straightforward calculation, since correlation in the spatial domain is equivalent to the product of one of the transforms and the complex conjugate of the other transform. It should be noted that correlation is not commutative, as is convolution, so that care must be taken in performing the complex conjugate of the correct transform.

More particularly, given that:

$$y(k) = \sum_i x(i)h(k+i), n = 0, 1, \ldots, N-1,$$

where the sum is over i from 0 to n-1, the Discrete Fourier Transform (DFT) of y(k) is $$Y(n) = X^*(n)H(n).$$

This relationship can be derived as follows:

$$
\begin{aligned}
Y(n) &= \sum_k y(k)e^{-j2\pi nk/N}, n = 0, 1, \ldots, N-1 \\
&= \sum_k \left[ \sum_i x(i)h(k+i) \right] e^{-j2\pi nk/N} \\
&= \sum_i x(i) \left[ \sum_k h(k+i)e^{-j2\pi nk/N} \right] \\
\text{letting } p &= k+i \\
&= \sum_i x(i) \left[ \sum_p h(p)e^{-j2\pi n(p-i)/N} \right] \\
&= \left[ \sum_i x(i)e^{j2\pi ni/N} \right] \left[ \sum_p h(p)e^{-j2\pi np/N} \right] \\
&= X^*(n)H(n).
\end{aligned}
$$

In order to use many FFT routines, the array sizes must be defined in powers of 2. To accommodate this requirement the standard procedure is to append zeros to the array. For this example, zeros are appended to the ends of both rows and columns for each of the two neighborhoods 51 and 52. In this case, both neighborhoods are extended to be 128×128 pixels square.

Some matrices must be defined in order to describe the calculations necessary to complete the frequency domain implementation. Before implementing the FFT technique, each value in the smaller neighborhood 51 must be replaced with its current pixel value minus the sample mean $\mu_x$ calculated over this neighborhood of points.

For this purpose, let a matrix A represent the FFT of an extended larger neighborhood 52A and D the FFT of the array where each element is the square of each element of the extended larger neighborhood. Similarly, let matrix C represent the FFT of an extended smaller neighborhood 51C, and B represent the FFT of the matrix whose first 48×48 elements are ones and then appended with zeros to extend it to 128×128. The numerator is determined by taking the inverse FFT of A times C-conjugate or C*. The sum of the $y^2$ terms in the denominator is determined by taking the inverse FFT of D times B-conjugate or B*. The sum of the y terms is calculated by taking the inverse FFT of A times B*.

It should be noted that the B matrix was introduced in the frequency domain to accommodate an equivalence in the spatial domain of the correlation of a 48×48 matrix of ones with the larger neighborhood to perform a summation of the appropriate terms.

PARAMETRIC HILL FINDER

Figure 9:
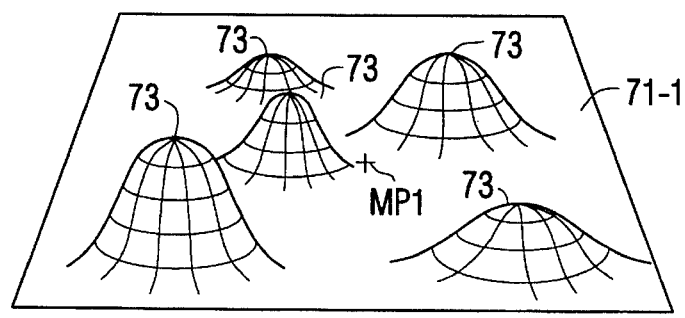
FIG. 9 diagrammatically illustrates a three-dimensional cross-correlation surface having respective peaks where there is a high degree of correlation of the contents of the respective image neighborhoods.

A parametric hill finder is an image processing routine that involves analyzing the surface character of the identified peaks 73 of the cross-correlation surface of FIG. 9. First, a standard least squares procedure is used to solve for the six coefficients that define the two dimensional polynomial (i.e., $f(x,y)=a_0+a_1x+a_2y+a_3xy+a_4x^2+a_5y^2$). A T matrix is then computed to describe an ellipse to represent the hill, by slicing the two dimensional polynomial at a value below the peak of the hill.

A parametric hill finder procedure is employed since it has been observed that, depending upon the hill finding routine employed, ellipses may not always accurately characterize the hills. For example, when the correlation of a two dimensional point, such as a road intersection, was observed, the correlation surface has the appearance one would expect—consisting of two ridges running perpendicular to each other. By employing a hill finder starting with the peak point and causing the hill to grow by searching for adjacent points at a lower value groups, both ridges will be grouped together. Also the ellipse that defines the uncertainty associated with the corresponding matching point may be too large and not centered on the peak of the hill. The parametric hill finder corrects this problem and defines a generally circular ellipse centered on the intersection of the roads.

LEAST SQUARES FIT OF TWO-DIMENSIONAL POLYNOMIAL TO A HILL

The basic problem involved in finding the hill is to fit the two dimensional polynomial:

$$f(x,y)=a_0+a_1x+a_2y+a_3xy+a_4x^2+a_5y^2=z$$

to the data $(x_i, y_i, z_i, i=1, \ldots, n, (n>5)$. A least squares solution involves forming six normal equations by taking the partial derivatives of the expression $$\Sigma[z_i-(a_0+a_1x_i+a_2y_i+a_3x_iy_i+a_4x_i^2+a_5y_i^2)]^2$$

with respect to each of the unknown coefficients $a_0, a_1, a_2, a_3, a_4$, and $a_5$.
The resulting normal equations are $$\Sigma z_i=a_0(n)+a_1(\Sigma x_i)+a_2(\Sigma y_i)+a_3(\Sigma x_iy_i)+a_4(\Sigma x_i^2)+a_5(\Sigma y_i^2)$$

$$\Sigma x_iz_i=a_0(\Sigma x_i)+a_1(\Sigma x_i^2)+a_2(\Sigma x_iy_i)+a_3(\Sigma x_i^2y_i)+a_4(\Sigma x_i^3)+a_5(\Sigma x_iy_i^2)$$

$$\Sigma y_iz_i=a_0(\Sigma y_i)+a_1(\Sigma x_iy_i)+a_2(\Sigma y_i^2)+a_3(\Sigma x_iy_i^2)+a_4(\Sigma x_i^2y_i)+a_5(\Sigma y_i^3)$$

$$\Sigma x_iy_iz_i=a_0(\Sigma x_iy_i)+a_1(\Sigma x_i^2y_i)+a_2(\Sigma x_iy_i^2)+a_3(\Sigma x_i^2y_i^2)+a_4(\Sigma x_i^3y_i)+a_5(\Sigma x_iy_i^3)$$

$$\Sigma x_i^2z_i=a_0(\Sigma x_i^2)+a_1(\Sigma x_i^3)+a_2(\Sigma x_i^2y_i)+a_3(\Sigma x_i^3y_i)+a_4(\Sigma x_i^4)+a_5(\Sigma x_i^2y_i^2)$$

$$\Sigma y_i^2z_i=a_0(\Sigma y_i^2)+a_1(\Sigma x_iy_i^2)+a_2(\Sigma y_i^3)+a_3(\Sigma x_iy_i^3)+a_4(\Sigma x_i^2y_i^2)+a_5(\Sigma y_i^4).$$

These six equations in six unknowns may be solved using the standard Gauss-Jordan elimination procedure.

DERIVING T MATRIX FROM TWO-DIMENSIONAL POLYNOMIAL

The ellipse required for the hill finder can be obtained by slicing a two dimensional polynomial along a contour. More specifically, the maximum value of the two dimensional polynomial must first be calculated. The coordinates indicating where the two dimensional polynomial is a maximum can be obtained by taking the partial derivatives of the function:

$$f(x,y)=a_0+a_1x+a_2y+a_3xy+a_4x^2+a_5y^2$$

with respect to x and y and equating the result to zero. The following values are obtained:

$$y_{max}=(a_1a_3-2a_2a_4)/(4a_4a_5-a_3^2),$$

$$x_{max}=-(a_1+a_3y_{max})/(2a_4).$$

The maximum value of the function is $f(x_{max},y_{max})$. Shifting the two dimensional polynomial to the origin (i.e., replacing x and y with $x+x_{max}$ and $y+y_{max}$, respectively) yields the equation:

$$f(x,y)=f_0+a_3xy+a_4x^2+a_5y^2,$$

where $f_0=f(x_{max},y_{max})$.
This equation may be rewritten as:

$$a_4'x^2+a_3'xy+a_5'y^2=1, \tag{3}$$

where
$a_3'=a_3/(f(x,y)-f_0)$,
$a_4'=a_4/(f(x,y)-f_0)$,
$a_5'=a_5/(f(x,y)-f_0)$.
Equation (3) may be recognized as the equation for an ellipse which has been rotated. Namely, an ellipse can be defined by the equation:

$$x^2/a^2+y^2/b^2=1.$$

Rotating this ellipse counter-clockwise by θ degrees yields $$(\cos^2\theta/a^2+\sin^2\theta/b^2)x^2+\sin 2\theta(1/a^2-1/b^2)xy+(\sin^2\theta/a^2+\cos^2\theta/b^2)y^2=1, \tag{4}$$

Equating equations (3) and (4) yields $$\theta=(\tfrac{1}{2})\tan^{-1}[a_3/(a_4-a_5)],$$

$$1/a^2=(1/2)(a_4+a_5+a_3/\sin 2\theta),$$

$$1/b^2=(1/2)(a_4+a_5-a_3/\sin 2\theta).$$

The T matrix is a [2×2] rotation and scaling matrix and can now be defined as:

$$t_{11}=(1/a)\cos\theta, t_{12}=(1/a)\sin\theta$$

$t_{21} = -(1/b) \sin \theta, t_{22} = (1/b) \cos \theta$.

Once the cross-correlation process is complete, the characteristics of the resulting cross-correlation surface are analyzed to determine how closely the geometric models map the two images into co-registration on the registration surface. If the two images are perfectly aligned or in exact co-registration with one another, the resulting cross-correlation surface would contain a large amplitude peak centered on coincident matching points of the two images. Because of the spectral, temporal and other differences in the two images, multiple peaks are typically contained in the correlation surface. Also, the presence of registration error causes the cross-correlation of peaks to be offset from the matching point. Due to the preliminary filtering to enhance edge content, the topology of the cross-correlation surface can be expected to contain ridges or elongated peaks that provide an indication where there is general alignment of linear features (edges).

Figure 10:
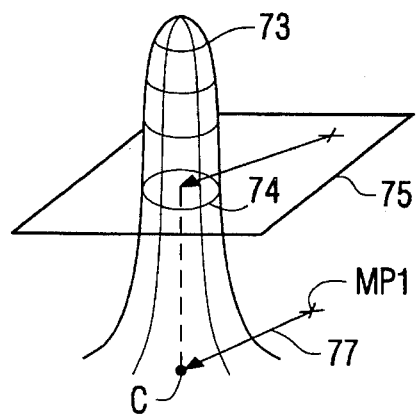
FIG. 10 shows a portion of a cross-correlation surface illustrating the manner in which peaks tend to have generally elliptically shaped cross-sections.

Namely, as shown in FIG. 10, the peaks 73 tend to have generally elliptically shaped cross-sections 74 (taken in horizontal plane slices 75). While both the shape of the ellipse of a respective peak and the offset 77 of its centroid C from the matching point MP are representative of the mismatch between the two images, no single peak can necessarily be relied upon to accurately represent the amount of registration error. Indeed, over the entire gridwork of matching points the topologies of each of the cross-correlation surfaces can be expected to contain plural peaks of differing amplitudes, shapes and directions of offsets from the matching points.

The offset 77 from an individual matching point MP to the centroid C of the peak is a vector having an amplitude corresponding to the length or magnitude of displacement of the offset and an angle associated with the direction of the offset. This vector quantity effectively represents the mean of the registration error, while the shape of the ellipse is representative of the standard deviation in the registration error.

As noted above, because the cross-correlation surface 71 of each neighborhood matching contains a plurality of peaks of different shapes and offsets, there is an ambiguity in the registration error. In order to resolve this ambiguity, the peaks are sorted on the basis of consistent subsets; specifically, the peaks are sorted into subsets of measurements that consistently point in the same direction of registration offset, using the mean and variance values associated with the cross-correlation surface peaks.

In order to keep computational complexity within reasonable limits, the number of peaks analyzed per cross-correlation surface or matching point is kept relatively small, for example no more than four per matching point. It should be realized, however, that the number of peaks per matching point is not limited to this or any other number. The number is based upon practical considerations, such as computational complexity as described above. Also, peak thresholding is employed to discriminate against peaks of less than a prescribed amplitude. The choice of threshold is based upon a balance of the probability of detecting peaks (true match) with the probability of introducing a false alarm due to a false match. Through experimentation it has been found that the threshold value may be on the order of 0.2, so that correlation peak values less than 0.2 are discarded.

Thus, after a set of (up to four) peak measurements has been identified for each of the cross-correlation surfaces obtained by the cross-correlations of neighborhoods 51-1T . . . 51-16T with respective neighborhoods 52-1T . . . 52-16T, the measurements are grouped in subsets. The members of a respective subset are those ones of all of the identified peak measurements whose means and variance values fall within a prescribed range of values. As an example, using a north-up orientation for the terrestrial images, where there are a plurality of peaks that are offset from their respective matching points in a southeasterly direction and within some variance window, then such southeasterly offset peaks are assigned to a 'southeasterly' subset.

The subset grouping process is a sequential sorting process, which preferably employs a dynamic programming mechanism or recursive optimization approach to generate the subsets. This technique sequentially adds peaks which best fit with the current consistent subset members. Best fit is determined by solving for an average ellipse and mean based upon consistent subset members' individual ellipses and offsets from their respective matching points. If a trial peak has the smallest membership value of all the remaining peaks that are not currently members of the consistent subset, then that peak is added to the subset if its membership value is less than a threshold (e.g. 2.25). The membership value is referred to as a 'normalized residual' and describes how well the average offset of the consistent subset fits within the trial peak's ellipse. For a discussion of dynamic programming techniques, attention may be directed to the texts "Introduction to Dynamic Programming," by G. L. Nemhauser John Wiley and Sons, Inc., 1967, and "Artificial Intelligence," by P. H. Winston, Addison-Wesley Publishing Co., 1984.

To illustrate the sorting process, using one of the up to four of the peaks 73 in the cross-correlation surface 71 of FIG. 9 associated with the first matching point MP1, as an initial reference measurement, the process proceeds to compare its measurement values (means and variance) with those of each of the identified peaks of the remaining (fifteen) cross-correlation surfaces (up to sixty in the present example). Every peak of these remaining cross-correlation surfaces which meets the criteria described above is grouped in the first subset. This peak measurement sorting process is repeated for each of the remaining peaks of all sixteen cross-correlation surfaces, so as to form a plurality of subsets, the measurements within each of which consistently point in the same direction, (although not all subsets point in the same direction). As is customary in sequential sorting processes, redundant peak locations are ignored as the search through the remaining cross-correlation surfaces proceeds, in order to reduce processing time. Also, no peak in the same cross-correlation surface as the reference peak is examined.

A weight, or quality metric, Qm is assigned to each subset indicative of the accuracy to which that subset is representative of misregistration between the two images. Factors employed in assigning the quality metric include the heights of the cross-correlation peaks within the subset and the number of times the same measurement value has been encountered during the processing of lower resolution images. For the base resolution images 21B and 22B, the quality metric is based only upon the heights of the peaks, since no lower resolution images have been processed.

Once each subset has been assigned a quality metric, redundant subsets are discarded and then the subsets are ordered or ranked by magnitude of quality metric (Qm1, Qm2, Qm3, . . . , Qmn) and the difference Dq between the two largest quality metrics Qm1 and Qm2 is compared with a prescribed threshold value Tq. If this difference (Dq= Qm1−Qm2) exceeds the threshold value Tq, then a measure of misregistration between the two images is produced using the subset having the largest quality metric. Specifically, the quality metric for each consistent subset is defined to the sum of each member's correlation value.

Figure 11:
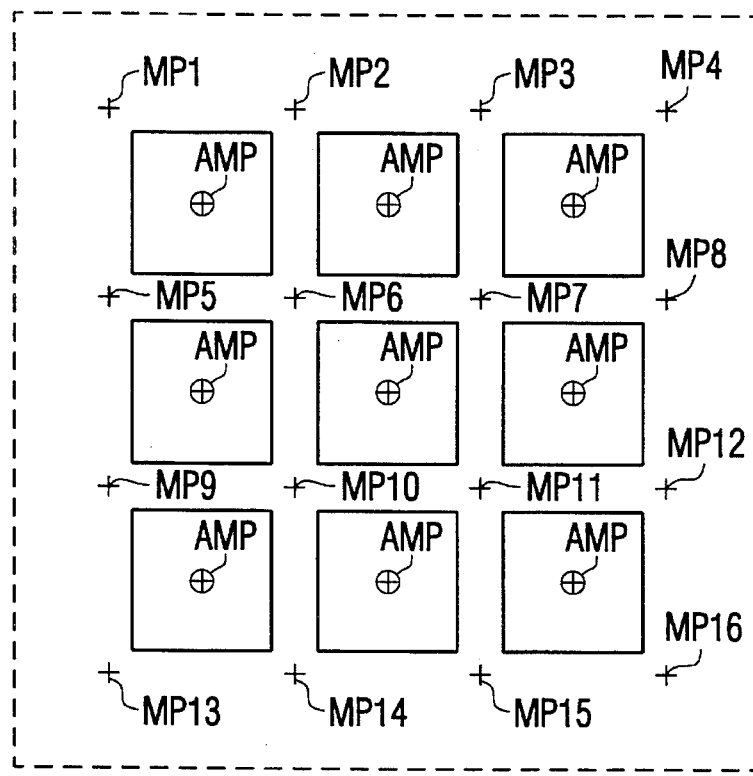
FIG. 11 diagrammatically illustrates the distribution of an additional sub-array of matching points interleaved with an original set of matching points and an additional set of neighborhoods defined about the auxiliary matching point grid.

If the compared difference Dq fails to exceed the threshold value Tq, the above described neighborhood cross-correlation process is repeated using first and second arrays of matching points having a number of matching points and a spatial resolution that has been increased relative to that of the previous neighborhood cross-correlation process. Namely, as diagrammatically illustrated in FIG. 11, an additional sub-array of (e.g. sixteen) matching points AMP is interleaved with the original set of (sixteen) matching points MP and an additional set of neighborhoods is defined about the auxiliary matching point grid in each of the base images. After edge-enhancement of each new neighborhood, the above-described cross-correlation operation is conducted for each of the new neighborhoods to derive a new set of cross-correlation surfaces. Again, up to four peaks within the new correlation surfaces are identified, so that there are now up to 128 peaks to which to apply the consistent subset sorting process.

Quality metrics are assigned to the subsets and the above described ranking and comparing of quality metrics is carried out for the new larger number of consistent subsets. If the quality metric difference exceeds the threshold value Tq, then a measure of misregistration between the two images is produced using that one of the new subsets having the largest quality metric. However, should the compared difference again fail to exceed the threshold value, the number of points and resolution of the matching point grid is again increased and the process is repeated. Should the compared difference fail to exceed the threshold value after executing a predetermined number (e.g. three) of iterations of subdividing the matching points grids and carrying out the matching process, the iterative process is halted and a measure of misregistration between the two images is derived in accordance with that (most recently derived) subset having the largest quality metric.

Using the derived measure of misregistration, at least one of the first and second geometric models of the sensors, through which the first and second digital images were originally obtained, is modified, so as to effectively decrease the degree of misregistration between the first and second terrestrial image plane-referenced images. The modification is such that there is a 'minimal perturbation' of parameters of the geometric models of the sensors. To facilitate processing of a set of n space parameters through which geometric models of the sensors are defined, conjugate gradient processing is preferably employed.

More particularly, what will hereinafter be identified as a 'minimal perturbation' adjustment procedure is employed to adjust the parameters of the collection geometry models for images in order to minimize the registration error that exists between two images. The procedure is termed a 'minimal perturbation' procedure because it attempts to find a solution with minimal perturbation of the geometric parameters if multiple solutions are available. A significant benefit of this approach is that the procedure is successful, even if the degrees of freedom contained in the observed registration error measurements are less than the degrees of freedom contained in the geometric parameters.

Figure 12:
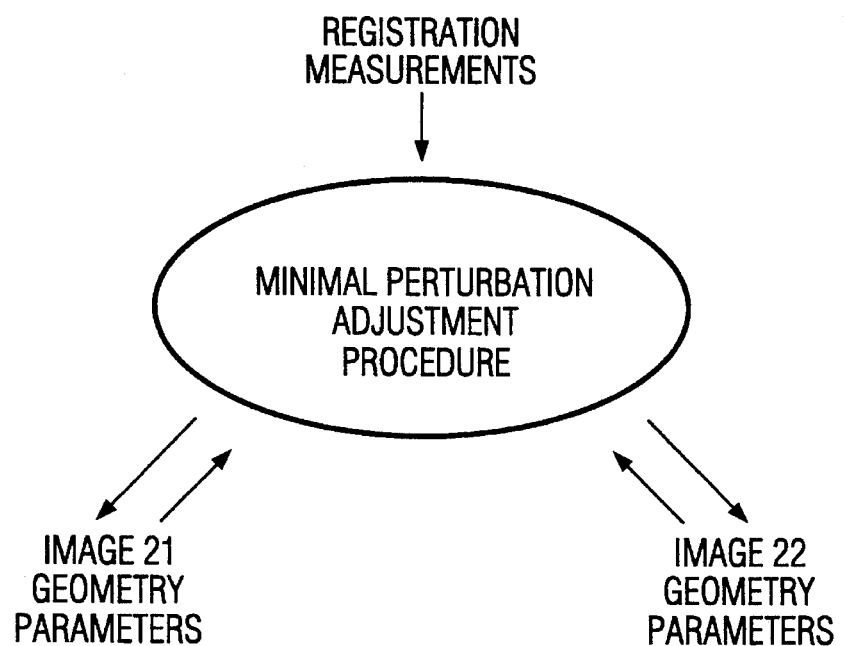
FIG. 12 diagrammatically illustrates the overall procedure for executing minimal perturbation adjustment.

The overall procedure for executing minimal perturbation adjustment is diagrammatically illustrated in FIG. 12. The inputs to the procedure are registration measurements derived from the cross-correlation operation described above, and the current geometry parameters for the two images. The output of the procedure is updated geometry parameters. The procedure permits the geometry parameters of either of the two images or both of the images to be adjusted simultaneously. The procedure is also easily extensible to permit adjustment of more than two images at a time.

Figure 13:
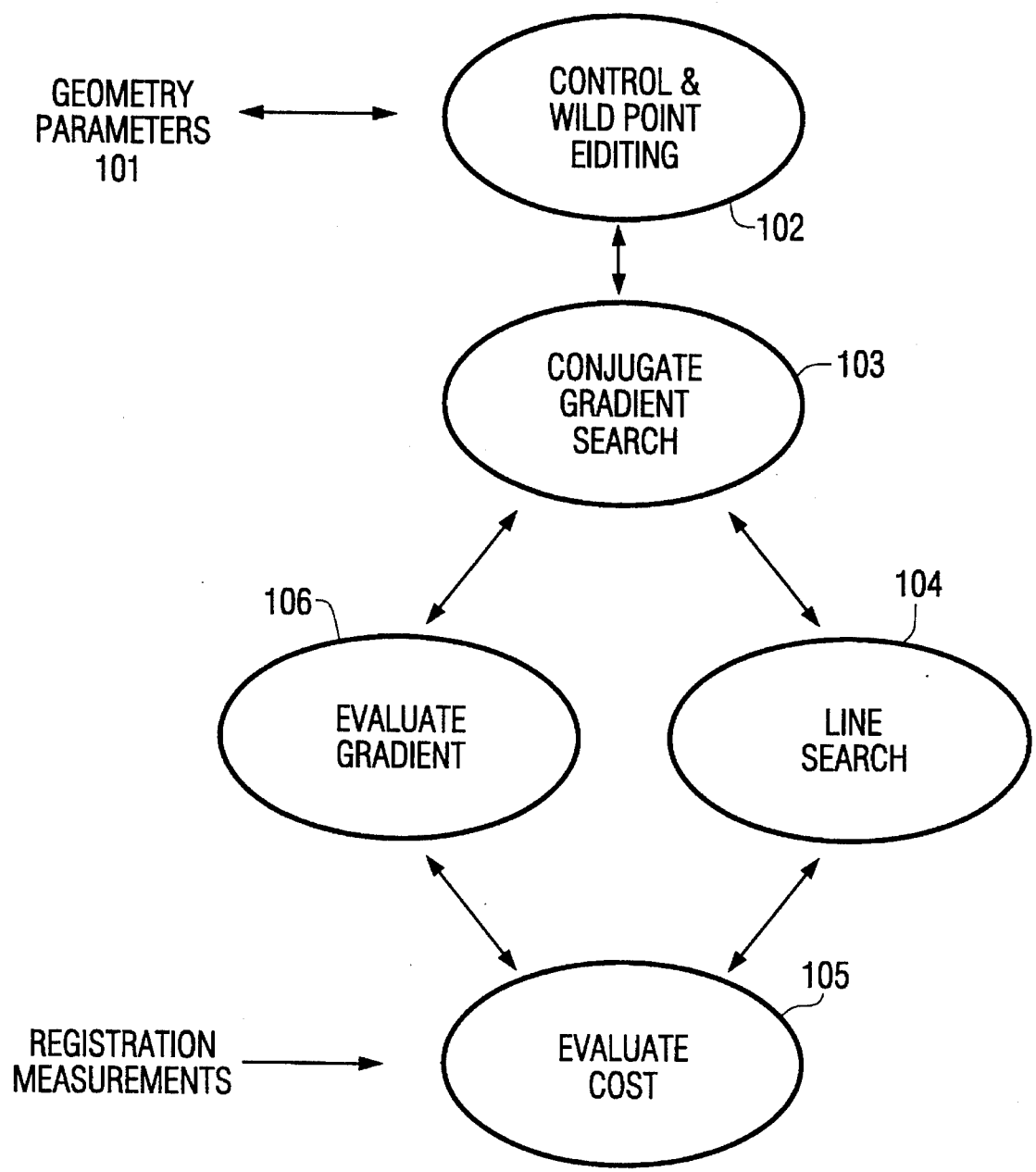
FIG. 13 shows the steps of a nonlinear optimization routine using conjugate gradient techniques employed for minimal perturbation adjustment.

The adjustment procedure is basically a nonlinear optimization routine using conjugate gradient techniques, and is organized in the manner shown in FIG. 13. The top level routine obtains the geometry parameters from the sensor models, shown in FIG. 13 at 101, executes the search, and then returns the adjusted or updated parameters.

GEOMETRY PARAMETERS 101

The geometry parameters themselves are viewed as an n-dimensional space (n=20 is typical for two images). Each point in the geometry parameter space 101 corresponds to a particular setting for the two collection geometries. For example, a first parameter may be the latitude of the sensor through which a first of the images was obtained, and a second parameter may be the longitude of that sensor. An mth parameter may be an attitude parameter (e.g. roll angle) for another sensor from which the second image was obtained. The actual assignment of geometry parameters is performed by the sensor specific geometry models and is hidden from the adjustment procedure. In this fashion, the assignment can vary depending upon the combination and order of sensors being adjusted and does not require changes within the adjustment procedure itself.

WILD POINT EDITING 102

Given a set of geometry parameters, an operation, shown at 102, termed WILD POINT EDITING, is carried out. All of the registration measurements provided to the adjustment procedure are not guaranteed to be valid. The consistent subset filtering performed prior to the adjustment guarantees that most of the points are valid and that all are reasonably consistent with each other. Wild point editing procedure 102 provides an additional filter to reduce the occurrence of invalid measurements within the registration procedure as a whole. Wild point editing step 102 is performed by iterating the conjugate gradient search procedure. After each iteration the worst registration measurement is examined to determine if it should be discarded as a wild point. If the cost for the worst point is significantly worse than the remaining measurements (mean plus two sigma threshold) and the cost is greater than an absolute threshold, then the point is discarded and the conjugate gradient search is repeated. Wild point editing step 102 is not performed if three or fewer measurements are present.

CONJUGATE GRADIENT SEARCH 103

Each point in the geometry parameter space 101 also has an associated cost. The objective of the search procedure is to wander through an extremely large parameter space looking for the point with the lowest cost. This is accomplished by calculating directions in the geometry parameter space 101 that point toward a reduced cost and then searching along the line in that direction for the lowest cost. The process of calculating a direction and performing a line search is iterated to successively reduce the cost. The iteration is terminated if the cost drops below an absolute threshold, the relative reduction in the last several iterations is below a threshold, or if a maximum number of iterations is exceeded. The directions are calculated in the conjugate gradient manner given by the relationship:

$$d_{i+1} = -.\nabla f_{i+1} + \beta d_i,$$

where $\beta = |.\nabla f_{i+1}|^2 / |.\nabla f_i|^2$.

The initial direction is set to the negative gradient direction, which corresponds to the direction in which the cost decreases most rapidly. Subsequent directions are then calculated based upon the gradient at the current point in n-space and the previous directions. This "conjugate gradient" direction reduces the search time compared to pure gradient techniques. It does this by reducing the oscillation that occurs in a pure gradient or steepest descent technique. When a line search results in no improvement in the cost, the next direction is taken in the negative gradient direction. This serves to reset the search. It is a necessary component of the search procedure because the conjugate gradient technique does not guarantee a cost reduction at all iterations.

EVALUATE GRADIENT 106

The procedure to evaluate the gradient is a numerical evaluation of the partial derivative of cost with respect to each adjustable parameter. A numerical partial derivative is performed by holding all parameters constant except for the one for which the partial derivative is being computed. The cost is first computed at the current value of all parameters. The cost is then computed a second time by adding a small value epsilon (e.g. 0.000001) to the parameter for which the partial derivative is being computed and all of the other parameter values are left unchanged. The partial derivative is then determined by subtracting the initial cost from the second cost and dividing by epsilon. This procedure is repeated for each of the adjustable parameters. The gradient is the vector composed of these partial derivatives.

The foregoing technique is a standard textbook procedure employed to numerically compute partial derivatives. However, the choice of the value of epsilon may control whether or not the technique yields satisfactory results. In order to make the technique more robust, an epsilon-delta technique to be described below is employed.

More particularly, epsilon is set to some initial value (e.g. $10^{-6}$) and the gradient is computed as previously described. Delta is then computed as:

$$\text{delta} = (|.\nabla f| \text{ epsilon})/(nf)$$

where f represents the cost and n corresponds to the number of adjustable parameters. The program then proceeds as follows.

If delta<$10^{-10}$
next_epsilon=10 epsilon
else if delta>$10^{-4}$
next_epsilon=epsilon/2
else
delta is acceptable
end delta if.

If delta is found to be acceptable, then this procedure is truncated. If delta is not found to be satisfactory, then the next trial value for epsilon (next_epsilon) is used to repeat the numerical computation of partial derivatives. This process is repeated until a satisfactory delta is found, a fixed number of iterations is exceeded, next_epsilon is less than $10^{-7}$, or next_epsilon is greater than 0.002 The numerical values used above (e.g. $10^{-6}$, $10^{-10}$, etc.) are determined empirically.

LINE SEARCH 104

The line search procedure uses a modified Newton-Raphson technique described by the relationship:

$$x_{i+1} = x_i - f'(x_i)/f''(x_i).$$

The purpose of line search step 104 is to locate the minimum cost along the line. Since the minimum cost may not be zero, the search concentrates on finding a zero of the first derivative. The second derivative is calculated at each point in the search and used to obtain the next estimate of the zero crossing in standard Newton-Raphson fashion. Derivatives are estimated by calculating the cost at three closely spaced points. The line search is terminated when the distance between two iterations along the line falls below a minimum, or when a maximum number of iterations is exceeded. The line search may be implemented as follows.

As described above, the cost at three closely spaced points is employed to compute the derivatives. Assume that the cost at T1 is denoted by cost_1 and the costs at T1-epsilon and T1+epsilon are denoted by cost_0 and cost_2, respectively. The first and second derivatives are then computed at point T1 by the following equations:

$$f'(T1) = (\text{cost\_2} - \text{cost\_0})/(2 \text{ epsilon}$$

$$f''(T1) = (\text{cost\_0} - 2 \text{ cost\_1} + \text{cost\_2})/\text{epsilon}^2.$$

The next approximation to where the cost is minimized is given by the modified Newton-Raphson technique which yields $$T = T1 - \text{epsilon}(\text{cost\_2} - \text{cost\_0})/(2 \text{ denom}),$$

where denom=cost_0–2 cost_1+cost_2.

This procedure is repeated unit the absolute value of the difference between T and T1 is less than or equal to 5 epsilon or a fixed number of iterations is exceeded.

Prior to computing the derivatives f'(T1) and f''(T1), a proper value for epsilon must be selected. The procedure is to calculate the deviation from a straight line and then to adjust epsilon, if necessary, to ensure that the cost has a reasonable curvature in a neighborhood of T1. The delta-epsilon technique developed for this problem will be described as an algorithmic procedure. Epsilon is set to some initial value (e.g. $10^{-6}$) and the cost is computed at T1-epsilon (cost_1) and also at T1+epsilon (cost_2). Delta is then computed as:

$$\text{delta} = (((\text{cost\_0} + \text{cost\_2})/2) - \text{cost\_1})/\text{cost\_1}$$

and the algorithm then proceeds in the same manner as described above to evaluate the gradient.

If delta<$10^{-10}$
next_epsilon=10 epsilon
else if delta>$10^{10-4}$
next_epsilon=epsilon/2
else
delta is acceptable
end delta if.

If delta is found to be acceptable, then this procedure is terminated. If delta is not found to be satisfactory, however, then the next trial value for epsilon (next_epsilon) is used to compute new cost_1 and cost_2. This process is repeated until a satisfactory delta is found, a fixed number of iterations is exceeded, next-epsilon is less than $10^{-7}$, or next_epsilon is greater than 0.002. The numerical values used above (e.g. $10^{-7}$, 0.002, etc.) are determined empirically

EVALUATE COST 105

Figure 14:
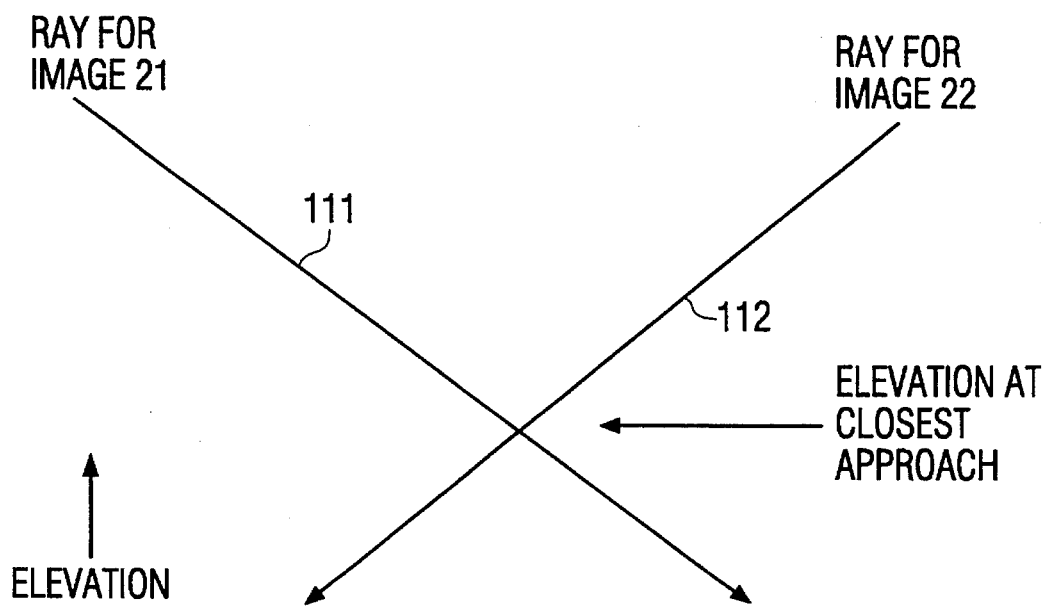
FIG. 14 diagrammatically illustrates a two ray intersection method for determining the cost for a measurement.

The evaluate cost routine 105 calculates the cost associated with a given set of geometry parameters. Cost is basically a mathematical metric associated with registration error as determined by the registration measurements. The measurements provided to the procedure consist of a data structure containing the estimated line and sample coordinates of a common point in each of the two images and the estimated two dimensional variance associated with the measurement. The cost for a measurement is determined with a two ray intersection method, diagrammatically illustrated in FIG. 14.

Figure 15:
FIG. 15 shows the manner in which error is measured in ground coordinates in the ray intersection technique of FIG. 14.

The first step in the intersection method is to determine the elevation corresponding to the point of closest approach of the two rays, shown at 111 and 112. The second step involves measuring the error 113 in ground coordinates as shown in FIG. 15. Finally, the error measurement is normalized by the estimated variance using the routine diagrammatically illustrated in FIGS. 16–19.

Figure 16:
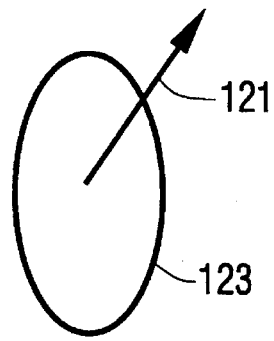
FIGS. 16–19 diagrammatically illustrate the steps of a routine for normalizing error measurement.
Figure 17:
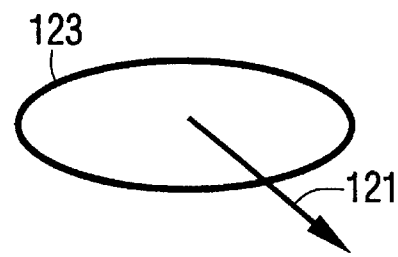
Figure 18:
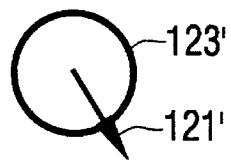
Figure 19:
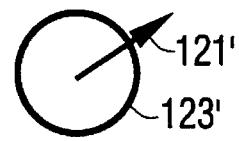

More particularly, a measurement vector 121 and its associated two-dimensional variance (ellipse) 123, shown in FIG. 16 are rotated by a 90 degree rotation of the major axis of the variance ellipse to the horizontal, as shown in FIG. 17. After this initial rotation the major and minor axes of the variance are scaled to unity, as shown in FIG. 18, which serves to scale the magnitude of the vector 121 and the transforms the shape of the variance ellipse to a circle 123'. Finally, as shown in FIG. 19, the measurement vector is rotated to X and Y parallax coordinate directions, resulting in a 2×2 rotation and scale matrix or T Matrix. This T Matrix is then used to convert an error measure in ground coordinates as delta latitude ($\Delta\phi$) and delta longitude ($\Delta\lambda$) to normalized error in X and Y parallax.

Once the parameters of the geometric models of the image collection sensors have been updated, the above-described neighborhood correlation process is repeated for increasingly higher spatial resolution versions of each of the two images up to and including the original, highest spatial resolution versions of the two terrestrial image plane-referenced images, so as to iteratively modify the geometric models of the sensors and thereby further improve mutual registration of the two images on the registration image surface. This multiresolution search process effectively constitutes a coarse to fine technique that maximizes the efficiency of the matching process. Matching points that define the most consistent subset at a lower resolution will contain features that are valid at the next higher resolution.

Upon completion of this multiresolution process, the parameters of the geometric models will have been effectively optimized, so that co-registration of like spatial resolution images of any of the available spatial resolutions image may be conducted.

Database addresses of the pixels of a respective image to be displayed for co-registration with other images and examination by the user are preferably generated in accordance with operator specified coordinates within the registration surface (e.g. latitude and longitude of the confines of the area of a terrestrial registration surface). The operator specified coordinates may be generated by employing a display screen user interface and an attendant display screen-to-registration surface mapping mechanism, which uses a set of mapping (e.g. linear) transformation equations to map or convert (horizontal or x, and vertical or y) display screen coordinates to (latitude and longitude) registration surface coordinates. These display screen-to-registration surface coordinates are then applied to the geometry model of a sensor of interest to derive an associated set of pixel coordinates (line and pixel locations) in the image space.

To display the derived pixels of the image space, its associated geometry model transforms the line and pixel coordinates in the digital image space to coordinates within the registration surface. For the case of a terrestrial image, the associated geometry model will translate the respective line and pixel locations of the spatial array of pixels that make up the digital image to corresponding latitude and longitude coordinates on a predefined geographical surface having a prescribed base elevation characteristic (e.g. a planar ground elevation surface). To display the pixel values whose image space coordinates have been transformed to these registration surface coordinates, the geometry model translation is cascaded with a registration surface-to-screen coordinates mapping operator, using an inverse of the above set of linear transformation equations to map the registration coordinates of the pixel values accessed from the image database to respective locations on the output display.

For additional details regarding the display mechanism and the display screen user interface, attention may be directed to the above mentioned co-pending application entitled "User Interface Mechanism for Interactively Manipulating Displayed Registered Images Obtained from Multiple Sensors Having Diverse Image Collection Geometries."

As will be appreciated from the foregoing description, the need to mutually register multiple images that have been derived from diverse types of image collection devices, including those having different observation geometry parameters, is successfully addressed by the iterative image processing mechanism of the present invention which correlates the edge content of reduced sized neighborhoods of pixels distributed throughout respective ones of a pair of digital images to be mutually aligned. The digital images to be registered are obtained by translating or referencing the original images to a prescribed registration surface, such as a terrestrial image plane, in accordance with the geometry projection parameters of the respective image collection systems from which the pair of original images were obtained. Then based upon the neighborhood correlation of edge content, an estimate is derived of the misalignment or misregistration of the two digital images in the registration surface. This estimate of misregistration is employed to modify or adjust either or both of respective sets of parameters through which the collection geometries of the image collection sources or sensors are defined, thereby correcting or improving the degree of co-registration of the respective translations or projections of the two original images upon the registration surface.

While we have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a digital image processing system in which plural images of an object are derived by a plurality of sensors, object observation and image collection parameters of which may be different from one another, and wherein said plural images of said object obtained by said plurality of sensors are digitized to form first and second digital images, said first digital image having a first array of pixels of a prescribed spatial resolution, and said second digital image having a second array of pixels of said prescribed spatial resolution, a method of bringing said first and second digital images into effective registration with one another comprising the steps of:

(a) processing said first and second digital images to obtain plural versions of each of said first and second digital images, having successively reduced spatial resolutions from said prescribed spatial resolution to a prescribed base resolution;

(b) comparing image contents of respective first neighborhoods of pixels associated with respective points of a first array of points within a first selected resolution version of said first digital image with image contents of respective second neighborhoods of pixels associated with respective points of a second array of points within said first selected resolution version of said second digital image, so as to derive a measure of misregistration between said first and second images, the contents of each of said first and second neighborhoods of pixels being defined with respect to a reference image surface in accordance with first and second geometric models of sensors through which said first and second digital images are obtained, said measure of misregistration between said first and second digital images being derived by (b1) comparing the extent to which a prescribed content of respective first neighborhoods of pixels associated with said first array of points within said first selected resolution version of said first digital image matches a prescribed content of respective second neighborhoods of pixels associated with said second array of points within said first selected resolution version of said second digital image, by (b1-1) emphasizing said prescribed content of said first and second neighborhoods of pixels, and (b1-2) comparing respective prescribed content-emphasized first neighborhoods of pixels with respective edge content-emphasized second neighborhoods of pixels, so as to derive a distribution of peaks representative of said measure of misregistration between said first and second digital images, such that said measure of misregistration between said first and second digital images is in accordance with offsets of peaks from points of said first and second arrays of points respectively, (b3) generating respective consistent subsets of offsets of peaks, which subsets consistently point in the same direction from points of said first and second arrays of points, respectively, said peaks falling within a prescribed range of offset values, (b4) processing said consistent subsets of offsets to derive, for each consistent subset, a measure of the accuracy to which that subset is representative of misregistration between said first and second images, (b5) comparing respective measures of accuracy derived for respective consistent subsets, and (b6) deriving said measure of misregistration between said first and second digital images, in accordance with said comparing step (b5) of respective measures of accuracy derived for respective consistent subsets; and (c) modifying at least one of said first and second geometric models of the sensors, through which said first and second digital images are obtained, in accordance with the measure of misregistration derived in step (b6), so as to effectively decrease misregistration between said first and second images.

2. A method according to claim 1, wherein said step (b1-2) of comparing comprises correlating respective prescribed content-emphasized first neighborhoods of pixels with respective edge content-emphasized second neighborhoods of pixels, so as to derive a distribution of correlation peaks representative of said measure of misregistration between said first and second digital images, such that said measure of misregistration between said first and second digital images is in accordance with offsets of correlation peaks from points of said first and second arrays of points, respectively, and generating respective consistent subsets of offsets of correlation peaks, which subsets consistently point in the same direction from points of said first and second arrays of points respectively, said correlation peaks falling within a prescribed range of offset values.

3. A method according to claim 2, wherein step (b) further comprises generating respective subsets of measurements representative of offsets of correlation peaks from points of said first and second arrays of points, and shapes of said correlation peaks that fall within a prescribed range of measurement values, and processing said subsets of measurements to derive, for each subset, a quality metric representative of the accuracy to which that subset is representative of misregistration between said first and second images, and deriving said measure of misregistration between said first and second images in accordance with a comparison of respective quality metrics derived for respective ones of said subsets.

4. A method according to claim 3, wherein step (b) further comprises comparing the difference between the two largest quality metrics with a prescribed threshold value and, in response to said difference exceeding said prescribed threshold value, deriving said measure of misregistration between said first and second digital images in accordance with the subset of measurement having the largest quality metric.

5. A method according to claim 3, wherein step (b) further comprises comparing the difference between the two largest quality metrics with a prescribed threshold value and, in response to said difference failing to exceed said prescribed threshold value, repeating step (b) using first and second arrays of points having an increased spatial resolution.

6. A method according to claim 5, wherein step (b) further comprises comparing the difference between the two largest quality metrics with a prescribed threshold value and, in response to said difference exceeding said prescribed threshold value, deriving said measure of misregistration between said first and second digital images in accordance with the subset of measurement having the largest quality metric, but, in response to said difference failing to exceed said prescribed threshold value, repeating step (b) using first and second arrays of points having a further increased spatial resolution.

7. A method according to claim 6, wherein, in step (b), in response to said difference failing to exceed said prescribed threshold value after a predetermined number of repetitions of step (b), using first and second arrays of points having successively increased values of spatial resolution, deriving said measure of misregistration between said first and second images in accordance with the subset of measurement having the largest quality metric.

8. A method according to claim 1, wherein step (c) further comprises modifying said at least one of said first and second geometric models of the sensors in such a manner as to effect a minimal perturbation of parameters of said first and second geometric models of said sensors, and performing conjugate gradient processing of a set of n space parameters through which geometric models of said sensors are defined.

9. A method according to claim 2, wherein, in step (b1-2), said step of comparing comprises correlating said respective edge content-emphasized first neighborhoods of pixels with respective edge content-emphasized second neighborhoods of pixels by Fast Fourier Transform processing.

10. A method according to claim 2, wherein, in step (b1-2), said step of comparing comprises correlating said respective edge content-emphasized first neighborhoods of pixels with respective edge content-emphasized second neighborhoods of pixels by a parametric hill finding routine.

* * * * *